UNITED STATES PATENT OFFICE.

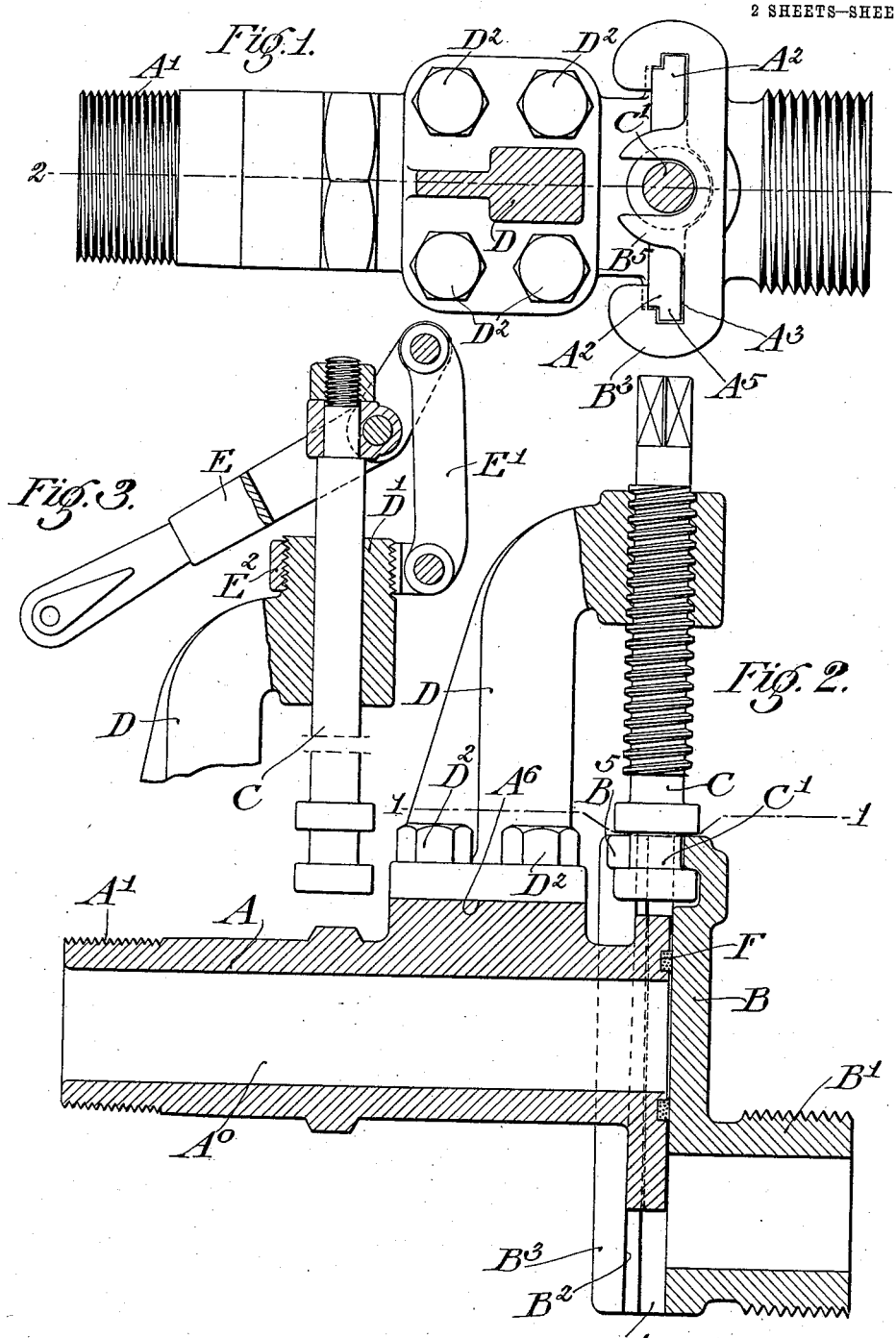

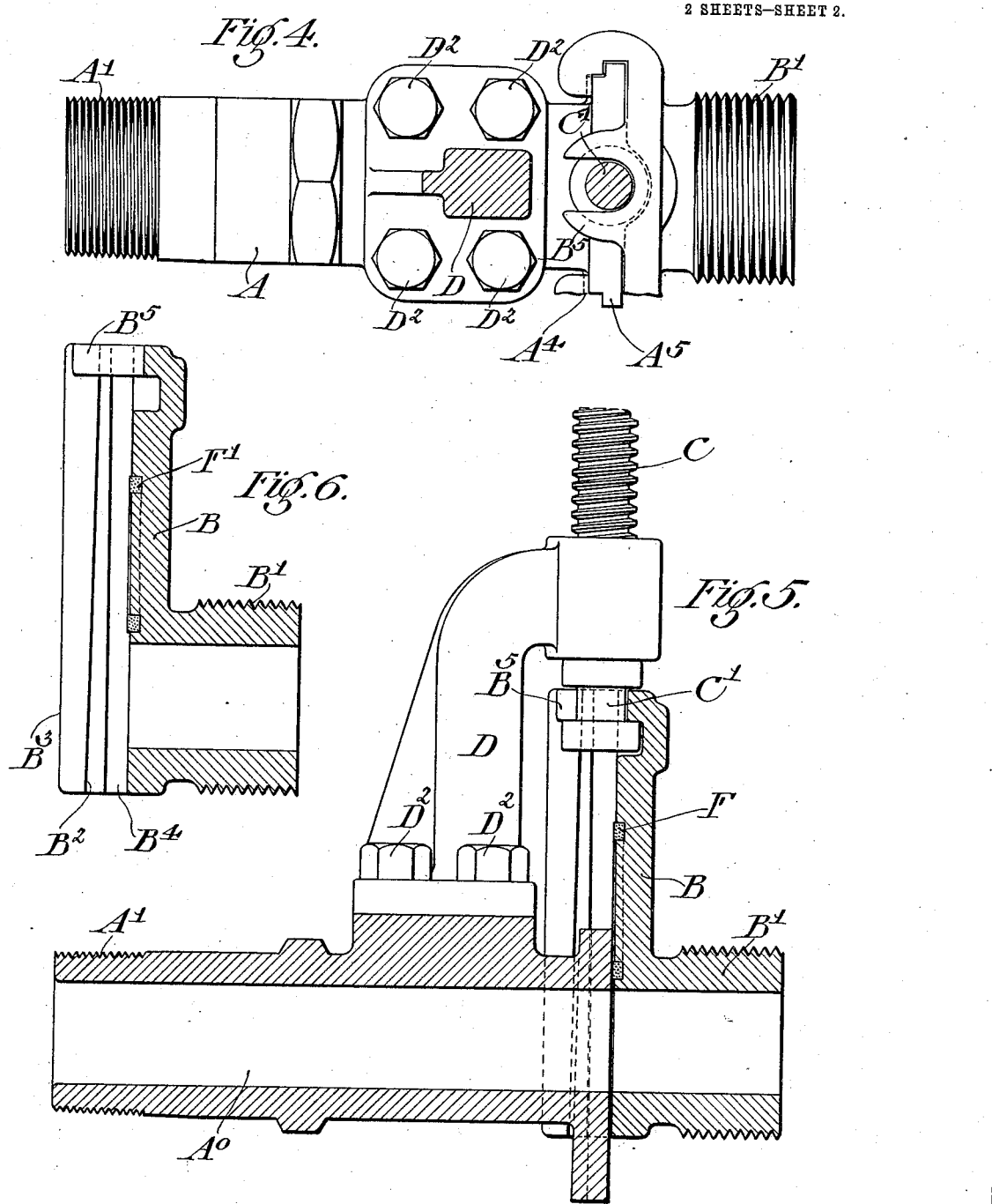

LAMBERT J. BORDO, OF PHILADELPHIA, PENNSYLVANIA.

BLOW-OFF VALVE.

1,084,601.

Specification of Letters Patent.

Patented Jan. 20, 1914.

Application filed June 9, 1909. Serial No. 501,137.

*To all whom it may concern:*

Be it known that I, LAMBERT J. BORDO, a citizen of the United States of America, residing in the city and county of Philadelphia, State of Pennsylvania, have invented a certain new and useful Improvement in Blow-Off Valves, of which the following is a true and exact description, reference being had to the accompanying drawings, which form a part thereof.

My present invention relates to valves, and particularly to valves such as the blow off valves of locomotive and other boilers, pulp digesters and analogous devices, which are subjected to severe erosive effects from the fluids and impurities carried thereby, which pass through the valves.

The object of the present invention is to provide a valve of the kind specified, which is simple in construction, can be made cheaply, will close tightly, may be readily opened and closed, and will be durable.

The various features of novelty which characterize my invention are pointed out with particularity in the claims annexed to and forming a part of this specification. For a better understanding of my invention however and the advantages possessed by it, reference should be had to the accompanying drawings and descriptive matter in which I have illustrated and described forms in which the invention may be embodied.

Of the drawings, Figure 1 is a plan view, partly in section, on the line 1—1 of Fig. 2. Fig. 2 is a section on the line 2—2 of Fig. 1. Fig. 3 is an elevation, partly in section, of a portion of a modified construction. Fig. 4 is a view similar to Fig. 1 but with a portion of the construction broken away to better show the valve construction. Fig. 5 is a view, generally similar to Fig. 2, but showing the valve in an open position, and also showing a slight modification in the arrangement of the packing. Fig. 6 is a section taken similarly to Fig. 5 through the detached valve member.

In the valve construction shown, A represents the valve seat member, which is tubular in form and has one end threaded at A' to permit the member to be screwed into the wall of the boiler or other receptacle to which the valve is to be connected. At the opposite end of the member A, transverse flanges $A^2$ are formed which have on their front side a plane valve seat $A^3$ extending transversely to the port $A^0$ passing through the member A.

B represents the valve member which, in the form shown, comprises a plate like body portion which closes the port $A^0$ when the valve is in the closed position shown in Fig. 2, and is provided also with a ported or open portion B' which is moved into register with the port $A^0$ when the valve is open as shown in Fig. 5. The ported portion B' may be threaded as shown for a hose or pipe connection. To draw the valve B tightly against the seat $A^3$ when the valve is in the closed position, coöperating wedge surfaces $B^2$ and $A^4$ are formed on the members B and A. As shown, the surfaces $A^4$ are formed on the back sides of the flanges $A^2$, and the surfaces $B^2$ are formed on the inner sides of the inturned flanges $B^3$ formed on the member B. The surfaces $B^2$ and $A^4$ are slightly inclined to the plane of the valve seat and coöperate to draw the valve B tightly against the valve seat when the valve is moved into the closed position. Preferably, other guide surfaces are provided for guiding the valve in its general movement transverse to the port $A^0$. In the form shown guide ribs $A^5$ are formed at the edges of the flange $A^2$, and these enter guide ways $B^4$ formed in the flanges $B^3$. To insure a tight joint when the valve is closed I provide an annular packing ring F which may be embedded in the valve seat $A^3$ as shown in Fig. 2 or may be embedded in the face of the valve B as shown in Figs. 5 and 6, and in either event surrounds the port $A^0$ when the valve is closed.

The valve member B is provided at its upper end with a slotted ear $B^5$ which receives a reduced portion C' of the enlarged head of the valve spindle C. Any suitable valve operating means may be employed. For instance, the valve spindle C may be either threaded in the bracket D, as shown in Figs. 2 and 5, or may slide through the bracket D and be operated by the lever E and link E', as shown in Fig. 3. In the construction shown in Fig. 3 the link E is pivotally connected to a member $E^2$ threaded on a threaded portion D' of the bracket D. The bracket D is secured as by bolts $D^2$ against a seat $A^6$ formed for the purpose on the side of the member A.

It is apparent that the construction illustrated is simple, durable and practically indestructible. No stuffing box is required and the packing ring whether mounted in the valve member or the ported member, as well as the portion of the other member, engaging the ring when the valve is closed is out of the range of the erosive action of the fluid passing through the valve.

Having now described my invention, what I claim as new, and desire to secure by Letters Patent, is:

1. In a valve of the kind specified, a tubular member flanged at one end to form a valve seat extending transversely to the bore of said member and having opposite side edges parallel to each other and having shoulders at the side edges inclined to the plane of the valve seat, a valve member provided with flanges at its sides which embrace the parallel edges of the flanges on the tubular member and provided with shoulders inclined to the plane of the valve seat engaging the first mentioned inclined shoulders, whereby when the valve is moved into the port closing position it is drawn toward the seat with a wedging action, a bracket detachably secured to the side of the tubular member, and means supported thereby for moving said valve along the valve seat.

2. In a valve of the kind specified, the combination of a tubular member flanged at one end to provide a valve seat extending transversely to the bore of said tubular member and terminating in parallel opposite side edges provided with surfaces inclined to the plane of the valve seat, a valve provided with flanges embracing said parallel side edges and provided with shoulders inclined to the plane of the valve seat engaging the first mentioned inclined shoulders to draw the valve toward its seat with a wedging action when it is moved in the valve closing position, a bracket detachably secured to the side of the tubular member, and means supported thereby for moving the valve along its seat.

3. In a valve of the kind specified, the combination of a tubular member flanged at one end to provide a valve seat extending transversely to the bore of said tubular member and terminating in opposite parallel side edges provided with surfaces inclined to the plane of the valve seat, a valve provided with flanges embracing said parallel side edges and provided with shoulders inclined to the plane of the valve seat and engaging the first mentioned inclined shoulders to draw the valve toward its seat with a wedging action when it is moved in the valve closing position, a bracket detachably secured to the side of the tubular member, a valve spindle mounted thereon provided with a grooved head, said valve being provided with a flange extending transversely to the valve seat and slotted to receive the slotted head of the valve spindle.

LAMBERT J. BORDO.

Witnesses:
  ARNOLD KATZ,
  D. STEWART.

---

Copies of this patent may be obtained for five cents each, by addressing the "Commissioner of Patents, Washington, D. C."